United States Patent
Fultz et al.

(10) Patent No.: US 9,688,159 B2
(45) Date of Patent: Jun. 27, 2017

(54) METHODS, APPARATUS, AND SYSTEMS FOR PREVENTING OVER-TEMPERATURE BATTERY OPERATION

(71) Applicant: GM GLOBAL TECHNOLOGY OPERATIONS LLC, Detroit, MI (US)

(72) Inventors: Derek W. Fultz, Royal Oak, MI (US); Alessandro G. Gonzalez, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 377 days.

(21) Appl. No.: 14/595,058

(22) Filed: Jan. 12, 2015

(65) Prior Publication Data
US 2016/0200216 A1    Jul. 14, 2016

(51) Int. Cl.
*H02J 7/00*    (2006.01)
*B60L 11/18*   (2006.01)
*B60L 3/00*    (2006.01)
*B60W 10/00*   (2006.01)

(52) U.S. Cl.
CPC ......... *B60L 11/1872* (2013.01); *B60L 3/0046* (2013.01); *B60L 11/1864* (2013.01); *B60W 10/00* (2013.01); *B60L 2240/545* (2013.01); *Y02T 10/7005* (2013.01); *Y02T 10/7061* (2013.01)

(58) Field of Classification Search
CPC .................................................... H02J 7/0031
USPC ............................................................ 320/136
See application file for complete search history.

(56) References Cited

U.S. PATENT DOCUMENTS

| | | | | |
|---|---|---|---|---|
| 5,633,574 A * | 5/1997 | Sage | ............... | H01M 10/44 320/107 |
| 5,642,100 A * | 6/1997 | Farmer | ............... | H02J 7/0031 307/31 |
| 2003/0107347 A1* | 6/2003 | Yoshizawa | ............ | H02J 7/0081 320/150 |
| 2009/0212627 A1* | 8/2009 | Sakata | ............... | H02H 9/001 307/10.7 |
| 2010/0226059 A1* | 9/2010 | Brown | ............... | H02J 7/0031 361/160 |
| 2013/0175999 A1* | 7/2013 | Thieme | ............... | B60L 3/04 320/136 |

\* cited by examiner

*Primary Examiner* — Yalkew Fantu
(74) *Attorney, Agent, or Firm* — Phillips Ryther & Winchester; Matthew D. Thayne

(57) ABSTRACT

Methods and systems for preventing over-temperature conditions in vehicle battery packs. In some implementations, such methods may comprise measuring a resistance within a contactor of an electric vehicle, estimating a temperature of the contactor using the measured resistance, and comparing the estimated temperature of the contactor with a threshold temperature. In some implementations, upon determining that the estimated temperature has exceeded the threshold temperature, the current delivered through the contactor may be limited.

20 Claims, 3 Drawing Sheets

METHODS, APPARATUS, AND SYSTEMS FOR PREVENTING OVER-TEMPERATURE BATTERY OPERATION

TECHNICAL FIELD

This disclosure relates to preventing over-temperature conditions for battery packs for vehicles. For example, in some embodiments and implementations, this disclosure relates to methods, apparatus, and systems for estimating the temperature of a portion of a battery system, such as a contactor of the battery system, and using the temperature estimates to limit current distribution as needed.

BACKGROUND

In electric, fuel cell ("FC"), and/or hybrid vehicles, a high voltage ("HV") battery system may be used to power electric drivetrain components of the vehicle (e.g., electric drive motors and the like). For example, an HV rechargeable energy storage system ("ESS") included in a vehicle may be used to power electric drivetrain components of the vehicle.

Monitoring a temperature of one or more components or portions of such a battery system may allow for more accurate battery system control and/or management decisions to be made based on such information, thereby improving overall battery performance. Accurate knowledge of the temperature of a battery system may further allow for improved diagnostics and/or prognostic methods to identify potential battery system issues. Conventional methods for estimating the temperature of a battery system may utilize a plurality of temperature sensors (e.g., thermistors) within the battery system configured to provide an indication of temperature. Such methods, however, may not provide a particularly accurate estimate of average temperature within a vehicle battery system, thereby leading to poorer vehicle drivability and/or increased vehicle energy usage and/or more rapid battery capacity degradation. Moreover, utilizing a plurality of temperature sensors to estimate temperature within a vehicle battery system may introduce increased initial production costs as well and ongoing repair and/or warranty costs.

Contactors used in high-current applications, such as performance batteries, in particular are known to overheat at high load. At approximately 150 degrees Celsius, the varnish used to coat the wires making up the contactor electromagnets typically break down. This may cause the contactors to fail and may open the pack circuit, resulting in loss of vehicle propulsion. Currently, there are no software controls in place to prevent drivers from inadvertently overheating and damaging components.

The present inventors have therefore determined that it would be desirable to provide methods, apparatus, and systems for monitoring battery temperatures and/or adjusting current distribution that overcome one or more of the foregoing limitations and/or other limitations of the prior art.

SUMMARY

Methods, apparatus, and systems are disclosed herein for preventing over-temperature conditions for battery packs for vehicles, such as electric vehicles comprising contactors.

Some embodiments may be used to actively prevent overheating to improve contactor life and prevent battery system failure. Some embodiments may also allow for use of the entire temperature operating range of the contactors before sacrificing vehicle performance. This may reduce added costs associated with overdesign of the contactors, which might otherwise be needed to prevent battery system failures.

In some embodiments, a measurement of the resistance of a powering coil of the contactors may be used in conjunction with a software lookup table to infer the temperature of the coil based on the value of the coil resistance. This may enable a software control that may be used to decrease the current passing through the contactor in order to prevent the potential for system and component failure.

In some embodiments and implementations, a software patch may be applied to existing or future vehicles to enable implementation without any hardware changes. Some embodiments and implementations may allow for maximization of a supplier's operating range in performance electric vehicles or electrical systems that require use of the contactors near their upper temperature limit. Various embodiments may also be used as an early detection system of any heat sources at or near the contactors that may cause battery pack/system failure or durability concerns.

In a more particular example of a method for limiting the operating temperature of a contactor within an electrical vehicle comprising a battery system comprising a contactor, the method may comprise measuring a resistance within the contactor, estimating a temperature of the contactor using the measured resistance, comparing the estimated temperature with a threshold temperature, and, upon determining that the estimated temperature has exceeded the threshold temperature, limiting current through the contactor.

In some implementations, the step of measuring a resistance within the contactor may comprise measuring a resistance within a coil of the contactor, such as a powering coil of the contactor.

In some implementations, the step of measuring a resistance within the contactor may comprise measuring a voltage and/or current within the contactor and using the measured voltage and/or current to determine the resistance within the contactor.

In some implementations, the threshold temperature may be between about 130 degrees Celsius and about 180 degrees Celsius. In some such implementations, the threshold temperature may be between about 140 degrees Celsius and about 180 degrees Celsius. In some such implementations, the threshold temperature may be about 150 degrees Celsius.

Some implementations may further comprise taking a plurality of temperature measurements of a contactor of an electric vehicle, taking a plurality of resistance measurements within the contactor associated with the plurality of temperature measurements, and correlating the resistance measurements with the temperature measurements. In some such implementations, the step of correlating the resistance measurements with the temperature measurements may comprise creating a lookup table from the temperature measurements and the resistance measurements. In some such implementations, the step of estimating a temperature of the contactor using the measured resistance may comprise using the lookup table to estimate the temperature of the contactor.

In a particular example of a system for limiting the operating temperature of a contactor of a vehicle battery system according to some embodiments, the system may comprise a vehicle battery system; at least one sensor configured to measure at least one of a current and a resistance of at least a portion of the vehicle battery system; and a temperature estimation module for estimating a temperature of at least a portion of the vehicle battery system. The temperature estimation module may be configured to receive battery data, such as resistance, voltage, and/or current within the contactor from the at least one sensor and estimate a temperature of the at least a portion of the vehicle battery system using the battery data.

Some embodiments may further comprise a current control module for limiting a current through the vehicle battery system based upon estimated temperatures received from the temperature estimation module.

In some embodiments, the vehicle battery system may comprise a contactor, and the at least a portion of the vehicle battery system may comprise at least a portion of the contactor, such as a powering circuit of the contactor.

In some embodiments, the current control module may be configured to compare an estimated temperature received from the temperature estimation module with a threshold temperature and, upon determining that the estimated temperature has exceeded the threshold temperature, reduce the current through the contactor.

In some embodiments, the vehicle battery system may comprise a high-voltage battery system, and the vehicle may comprise an electric vehicle.

In some embodiments, the current control module may be configured to compare an estimated temperature with a threshold temperature and, upon determining that the estimated temperature has exceeded the threshold temperature, reduce the current through the at least a portion of the vehicle battery system, such as through the contactor of the vehicle battery system.

In some embodiments, the temperature estimation module may be configured to use a lookup table to estimate the temperature of the at least a portion of the vehicle battery system. In some such embodiments, the lookup table may be configured to correlate temperature with resistance for the vehicle battery system. In embodiments in which the vehicle battery system comprises a contactor, the lookup table may be configured to correlate temperature within the contactor with resistance within the contactor.

In some embodiments, the current control module may be configured to compare an estimated temperature received from the temperature estimation module with at least one threshold temperature and, upon determining that the estimated temperature has exceeded the at least one threshold temperature, reduce the current through the vehicle battery system.

In some embodiments, the at least one threshold temperature may comprise a plurality of threshold temperatures. In some such embodiments, the current control module may be configured to compare an estimated temperature received from the temperature estimation module with a first threshold temperature of the plurality of threshold temperatures and, upon determining that the estimated temperature has exceeded the first threshold temperature, reduce the current through the vehicle battery system by a first amount. Similarly, the current control module may be configured to compare an estimated temperature received from the temperature estimation module with a second threshold temperature of the plurality of threshold temperatures and, upon determining that the estimated temperature has exceeded the second threshold temperature, reduce the current through the vehicle battery system by a second amount greater than the first amount.

In an example of a system for limiting the operating temperature of a contactor within a high-voltage battery system of an electric vehicle according to another embodiment, the system may comprise a high-voltage vehicle battery system comprising a contactor. The system may further comprise at least one sensor configured to measure a resistance of the contactor of the high-voltage vehicle battery system. In some embodiments, the sensor may be configured to derive resistance measurements from current and voltage measurements at the contactor.

Some embodiments may further comprise a temperature estimation module for estimating a temperature of the contactor, wherein the temperature estimation module is configured to receive resistance data from the at least one sensor and estimate a temperature of the contactor using the resistance data by using a lookup table that correlates temperature within the contactor with resistance within the contactor. A current control module may be coupled with the temperature estimation module, wherein the current control module is configured to compare an estimated temperature received from the temperature estimation module with at least one threshold temperature and, upon determining that the estimated temperature has exceeded the at least one threshold temperature, reduce the current through the contactor The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Embodiments of the systems, apparatus, and methods disclosed herein may be used to infer a temperature of a portion of a battery system of an electric vehicle, such as a contactor of the battery system, from measured quantities of contactor coil resistance, voltage, and/or current to adjust current distribution as needed to improve component durability and reduce battery system failures and/or other undesirable outcomes.

Figure 1:
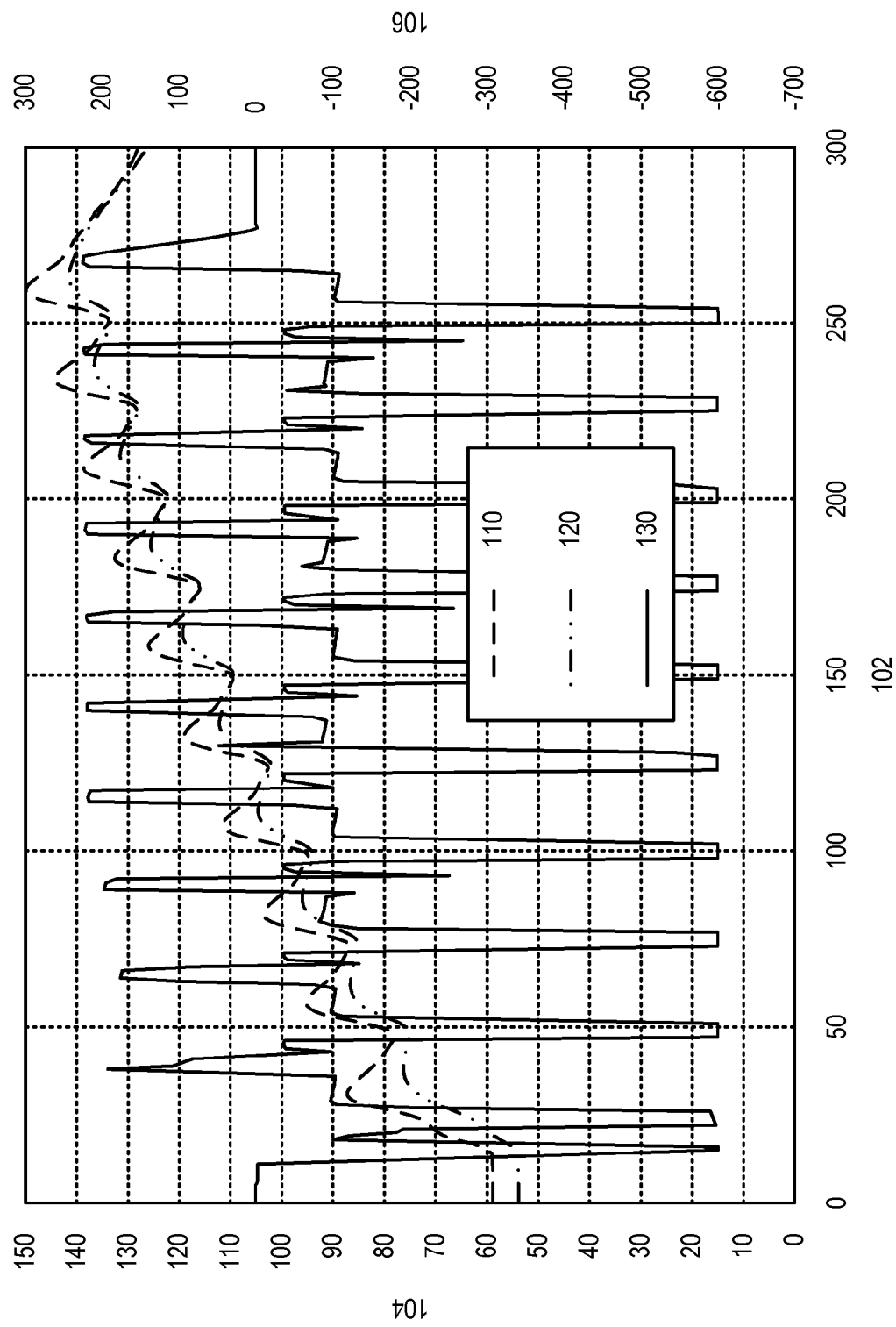
FIG. 1 is a graph demonstrating exemplary relationships between pack current and temperature over time within certain components of an electric vehicle.

Additional details of certain embodiments and implementations will now be discussed in greater detail in connection with the accompanying figures. FIG. 1 depicts a graph demonstrating exemplary relationships between pack current and temperature over time within various components of an electric vehicle. More particularly, axis 102 of the graph represents time in seconds, axis 104 represents temperature in degrees Celsius, and axis 106 represents pack current in Amperes. Plot line 110 represents the negative contactor terminal temperature over time, plot line 120 represents the traction power inverter module (TPIM) connector negative terminal temperature over time, and plot line 130 represents the pack current over time.

As shown in the graph of FIG. 1, the behavior of the negative contactor terminal temperature is relatively predictable based on the reading of the TPIM connector negative terminal temperature and vice versa. Moreover, a relatively small number of cycles (ten) of 50-80 miles per hour may result in a contactor temperature that is undesirably high. At approximately 150 degrees Celsius, the varnish used to coat the wires making up the contactor electromagnets may break down. This may cause the contactors to fail and may open the pack circuit, which may result in loss of vehicle propulsion.

In order to prevent such over temperature conditions and/or provide for other benefits, such as detecting heat sources at or near the contactors, which may also cause battery pack/system failure, performance problems, durability issues, or other problems, the present inventors have determined that there is a relationship between parameters in the contactors' powering coil, such as resistance and/or voltage, and the temperature of the contactor coil and/or other components or parts of the contactors.

Figure 2:
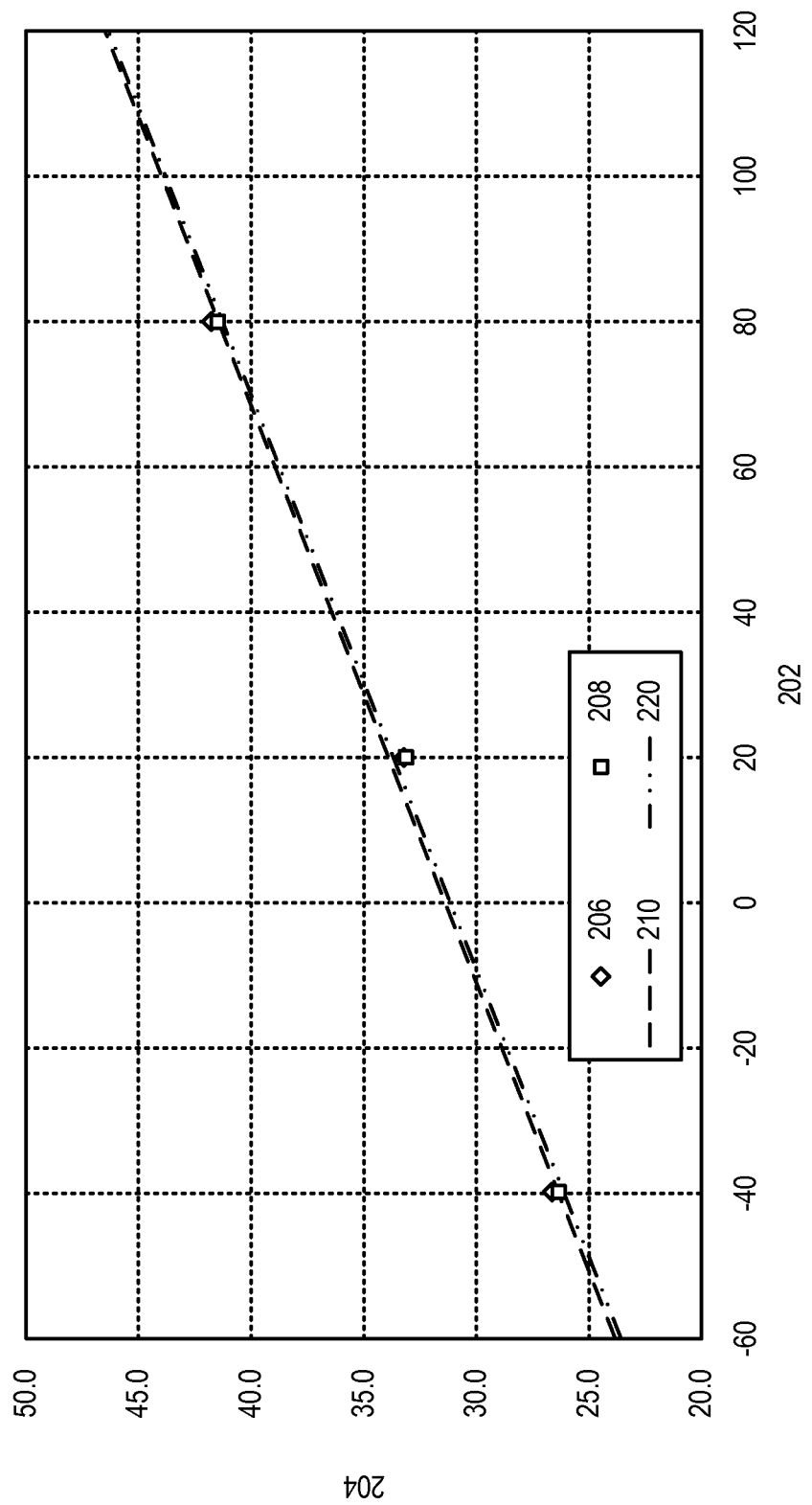
FIG. 2 is a graph demonstrating exemplary relationships between a resistance of a contactor coil of an electric vehicle and a temperature of the coil.

FIG. 2 depicts a graph demonstrating exemplary relationships between the contactor coil resistance and a temperature of the coil. Axis 202 of this graph represents the chamber soak temperature in degrees Celsius and axis 204 represents the coil resistance in Ohms. Data points 206 and 208 represent particular resistance measurements from positive and negative terminals, respectively, of a contactor coil powering circuit. Plot lines 210 and 220 were generated from linear regression techniques applied using the data points 206 and 208. For these particular data points, the correlation coefficient squared ("R2") is about 0.99, which means the data strongly exhibits a linear relationship.

Since electrical components of this type are typically not constructed with self-temperature monitoring to prevent overheating, this roughly linear relationship may be used to identify temperature of unmonitored components. Thus, some embodiments and implementations may use a parameter of one or more components of the contactor, such as a measurement of the voltage and/or resistance of a power coil of the contactor, to infer or estimate a temperature of the contactor. In some such embodiments, a software lookup table may be used to infer the temperature of the coil based on the value of the coil resistance. This may enable a software control that can be used to decrease the current passing through the contactor, thereby preventing, or at least reducing, the potential for system and/or component failure.

Typically, there are no software controls in place to prevent drivers from inadvertently overheating and damaging components. Various embodiments and implementations disclosed herein may therefore be used to actively prevent overheating to improve contactor life and prevent battery system failure. Such embodiments may also improve the ability of electric vehicles to maximize use of the entire temperature operating range of the contactors before sacrificing vehicle performance, which may reduce added cost associated with overdesign of the contactors. Some embodiments may also, or alternatively, allow for use of the contactors at a higher temperature, which may be closer to their upper temperature limit, due to the ability to more precisely sense temperatures and apply counter measures to avoid battery damage and/or other undesirable effects, as disclosed elsewhere herein.

Some embodiments may allow for updating of current vehicles with a software patch. Thus, such embodiments may enable implementation of one or more of the inventive principles disclosed herein with only minor changes to the measurement hardware in a vehicle integration control module (VICM).

In addition, the principles disclosed herein may allow for early detection of problematic heat sources at or near the contactors. For example, various embodiments disclosed herein may be used to detect and/or prevent overheating high voltage connections within a Battery Bulkhead Disconnect Unit (BBDU) of a battery system within a vehicle.

Figure 3:
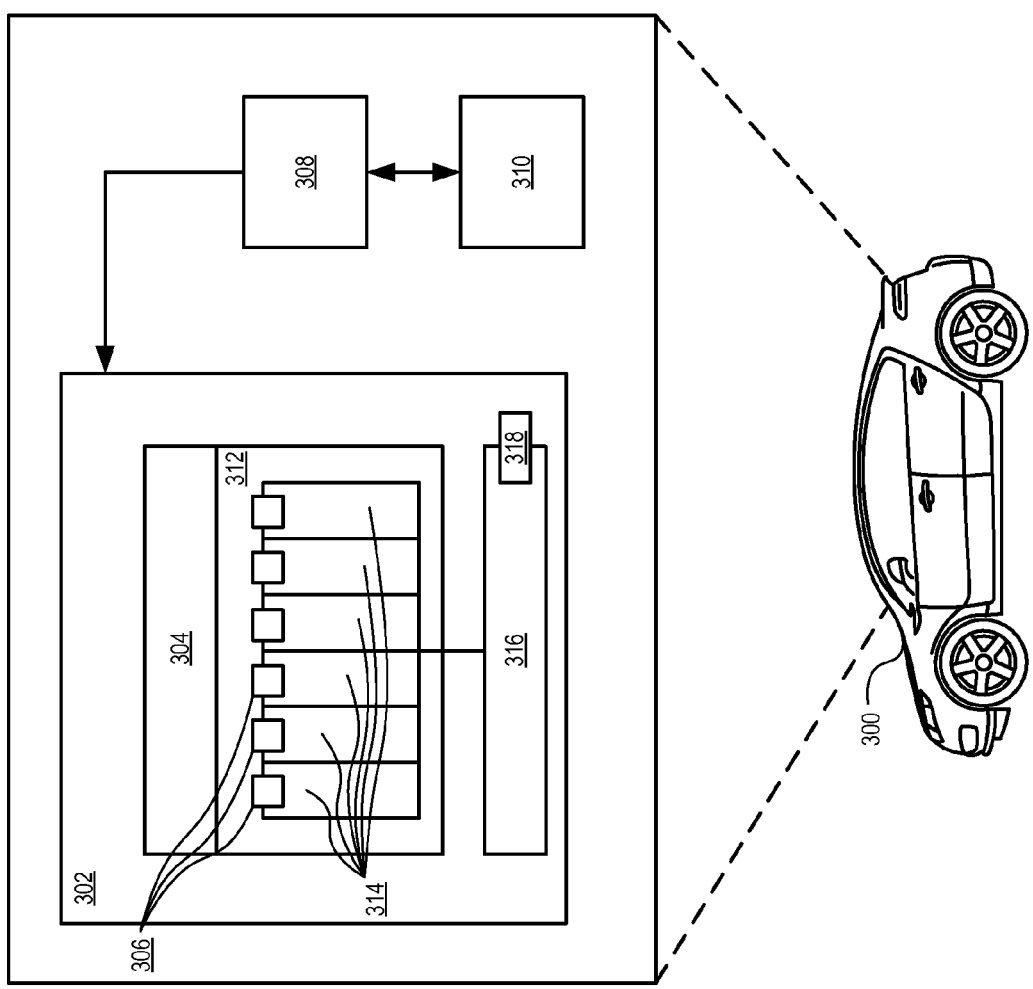
FIG. 3 depicts an embodiment of a system for limiting the operating temperature of a contactor of a vehicle battery system of an electric vehicle.

FIG. 3 illustrates an exemplary system for limiting the operating temperature of a contactor 316 of a vehicle battery system 302 in a vehicle 300 consistent with embodiments disclosed herein. The vehicle 300 may be a motor vehicle, a marine vehicle, an aircraft, and/or any other type of vehicle, and may include an internal combustion engine ("ICE") drivetrain, an electric motor drivetrain, a hybrid engine drivetrain, an FC drivetrain, and/or any other type of drivetrain suitable for incorporating the systems and methods disclosed herein. The vehicle 300 may include a battery system 302 that, in certain embodiments, may be an HV battery system. The HV battery system may be used to power electric drivetrain components (e.g., as in an electric, hybrid, or FC power system).

The battery system 302 may include a battery control system 304. The battery control system 304 may be configured to monitor and control certain operations of the battery system 302. For example, the battery control system 304 may be configured to monitor and control charging and discharging operations of the battery system 302. In certain embodiments, the battery control system 304 may be utilized in connection with the methods disclosed herein to estimate a temperature of one or more portions of the contactor 316 of the battery system 302.

In certain embodiments, the battery control system 304 may be communicatively coupled with one or more sensors 306 (e.g., voltage sensors, current sensors, temperature sensors, and/or the like, etc.) and/or other systems configured to enable the battery control system 304 to monitor and control operations of the battery system 302. For example, sensors 306 may provide battery control system 304 with information used to estimate a temperature, a capacity, a state of charge ("SOC") and/or a state of health ("SOH"), estimate a resistance, measure a current, and/or measure voltage of the battery system 302 and/or its constituent components.

One or more additional sensors 318 may be used to monitor/measure parameters of contactor 316. Thus, for example, a sensor 318 may be used to measure a voltage of a powering circuit/coil of contactor 316, which, as discussed above, may be related to the temperature of the contactor 316 and therefore may be used to estimate this temperature.

The battery control system 304 may further be configured to provide information to and/or receive information from other systems included in the vehicle 300. For example, the battery control system 304 may be communicatively coupled with a vehicle computer system 308.

Vehicle computer system 308 may also be coupled with a motor 310, such that information from battery control system 304 may be used to adjust operation of the vehicle by, for example, adjusting current delivered to motor 310, directly or indirectly. In some embodiments, vehicle computer system may therefore comprise a current control module and a temperature estimation module. The current control module may be used to limit a current through the vehicle battery system 302 based upon estimated temperatures received from the temperature estimation module.

In some embodiments, the vehicle computer system may be configured to receive an estimated temperature of the contactor from the temperature estimation module and may be configured to compare the estimated temperature with a threshold temperature. Upon determining that the estimated temperature has exceeded the threshold temperature, the vehicle computer system may be configured to limit current through the contactor. In some embodiments, the threshold temperature may be between about 130 degrees Celsius and about 180 degrees Celsius. In some such embodiments, the threshold temperature may be between about 140 degrees Celsius and about 180 degrees Celsius. In some such embodiments, the threshold temperature may be about 150 degrees Celsius.

In certain embodiments, the battery control system 304 may be configured, at least in part, to provide information regarding the battery system 302 (e.g., information measured by sensors 306, 318, and/or determined by control system 304) to vehicle computer system 308 and/or a user of the vehicle 300. In some embodiments, the battery control system 304 may be configured to provide information regarding contactor 316 to vehicle computer system 308. For example, in some embodiments, a voltage may be measured at a powering coil/circuit of the contactor 316, from which the resistance of this circuit may be measured. This resistance value may be sent to vehicle computer system 308, which may use this value to calculate an estimate of the temperature of the contactor 316. In some embodiments, this may be accomplished using a software lookup table.

In some embodiments, vehicle computer system 308 may use the estimated temperature to limit/adjust current delivered to the contactor 316 and/or motor 310. In some embodiments, vehicle computer system 308 may compare the estimated temperature of contactor 316 with one or more threshold temperatures and, upon determining that the estimated temperature has exceeded one or more of the threshold temperatures, limit or adjust the current accordingly. Thus, in some embodiments, the amount with which the current is limited may correspond with the threshold temperatures.

The battery system 302 may include one or more battery packs 312 suitably sized to provide electrical power to the vehicle 300. Each battery pack 312 may include one or more subdivisions 314 (e.g., cells). The subdivisions 314 may comprise sub-packs, each of which may comprise one or more battery cells utilizing any suitable battery technology or combination thereof. Suitable battery technologies may include, for example, lead-acid, nickel-metal hydride ("NiMH"), lithium-ion ("Li-Ion"), Li-Ion polymer, lithium-air, nickel-cadmium ("NiCad"), valve-regulated lead-acid ("VRLA") including absorbed glass mat ("AGM"), nickel-zinc ("NiZn"), molten salt (e.g., a ZEBRA battery), nickel manganese cobalt ("NMC"), lithium iron phosphate ("LFP"), lithium manganese oxide ("LMO"), and/or other suitable battery technologies and/or combination thereof.

Each subdivision 314 may be associated with a sensor 306 configured to measure one or more parameters (e.g., temperature, voltage, current, impedance, SOC, etc.) associated with each battery subdivision 314. Although FIG. 3 illustrates separate sensors 306 associated with each battery subdivision 314, in some embodiments, a sensor configured to measure various electrical parameters associated with a plurality of subdivisions 314 may also be utilized.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. A method for limiting an operating temperature of a contactor within an electric vehicle, the method comprising the steps of:
   measuring a resistance within a contactor of an electric vehicle;
   estimating a temperature of the contactor using the measured resistance;
   comparing the estimated temperature of the contactor with a threshold temperature; and
   upon determining that the estimated temperature has exceeded the threshold temperature, limiting current through the contactor.

2. The method of claim 1, wherein the step of measuring a resistance within a contactor of an electric vehicle comprises measuring a resistance within a coil of the contactor.

3. The method of claim 1, wherein the step of measuring a resistance within a contactor of an electric vehicle comprises measuring a voltage within the contactor and using the measured voltage to determine the resistance within the contactor.

4. The method of claim 1, wherein the threshold temperature is between about 130 degrees Celsius and about 180 degrees Celsius.

5. The method of claim 1, further comprising:
taking a plurality of temperature measurements of a contactor of an electric vehicle;
taking a plurality of resistance measurements within the contactor associated with the plurality of temperature measurements; and
correlating the resistance measurements with the temperature measurements.

6. The method of claim 5, wherein the step of correlating the resistance measurements with the temperature measurements comprises creating a lookup table from the temperature measurements and the resistance measurements.

7. The method of claim 6, wherein the step of estimating a temperature of the contactor using the measured resistance comprises using the lookup table to estimate the temperature of the contactor.

8. The method of claim 1, wherein the electric vehicle comprises a hybrid electric vehicle.

9. A system for limiting an operating temperature of a contactor of a vehicle battery system, comprising:
a vehicle battery system;
at least one sensor configured to measure at least one of a current and a resistance of at least a portion of the vehicle battery system;
a temperature estimation module for estimating a temperature of at least a portion of the vehicle battery system, wherein the temperature estimation module is configured to receive battery data from the at least one sensor and estimate the temperature of the at least a portion of the vehicle battery system using the battery data; and
a current control module for limiting a current through the vehicle battery system based upon estimated temperatures received from the temperature estimation module.

10. The system of claim 9, wherein the vehicle battery system comprises a contactor, and wherein the at least a portion of the vehicle battery system comprises at least a portion of the contactor.

11. The system of claim 10, wherein the battery data comprises at least one of a resistance, a voltage, and a current within the contactor.

12. The system of claim 11, wherein the current control module is configured to compare an estimated temperature received from the temperature estimation module with a threshold temperature and, upon determining that the estimated temperature has exceeded the threshold temperature, reduce the current through the contactor.

13. The system of claim 9, wherein the vehicle battery system comprises a high-voltage battery system, and wherein the vehicle comprises an electric vehicle.

14. The system of claim 9, wherein the current control module is configured to compare an estimated temperature with a threshold temperature and, upon determining that the estimated temperature has exceeded the threshold temperature, reduce the current through the at least a portion of the vehicle battery system.

15. The system of claim 9, wherein the temperature estimation module is configured to use a lookup table to estimate the temperature of the at least a portion of the vehicle battery system.

16. The system of claim 15, wherein the lookup table correlates temperature with resistance for the vehicle battery system.

17. The system of claim 16, wherein the vehicle battery system comprises a contactor, and wherein the lookup table correlates temperature within the contactor with resistance within the contactor.

18. The system of claim 9, wherein the current control module is configured to compare an estimated temperature received from the temperature estimation module with at least one threshold temperature and, upon determining that the estimated temperature has exceeded the at least one threshold temperature, reduce the current through the vehicle battery system.

19. The system of claim 18, wherein the at least one threshold temperature comprises a plurality of threshold temperatures, wherein the current control module is configured to compare an estimated temperature received from the temperature estimation module with a first threshold temperature of the plurality of threshold temperatures and, upon determining that the estimated temperature has exceeded the first threshold temperature, reduce the current through the vehicle battery system by a first amount, and wherein the current control module is configured to compare an estimated temperature received from the temperature estimation module with a second threshold temperature of the plurality of threshold temperatures and, upon determining that the estimated temperature has exceeded the second threshold temperature, reduce the current through the vehicle battery system by a second amount greater than the first amount.

20. A system for limiting an operating temperature of a contactor within a high-voltage battery system of an electric vehicle, comprising:
a high-voltage vehicle battery system comprising a contactor;
at least one sensor configured to measure a resistance of the contactor of the high-voltage vehicle battery system;
a temperature estimation module for estimating a temperature of the contactor, wherein the temperature estimation module is configured to receive resistance data from the at least one sensor and estimate a temperature of the contactor using the resistance data by using a lookup table that correlates temperature within the contactor with resistance within the contactor; and
a current control module coupled with the temperature estimation module, wherein the current control module is configured to compare an estimated temperature received from the temperature estimation module with at least one threshold temperature and, upon determining that the estimated temperature has exceeded the at least one threshold temperature, reduce the current through the contactor.

* * * * *